United States Patent
Hiraguchi

(10) Patent No.: US 7,175,124 B2
(45) Date of Patent: Feb. 13, 2007

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 350 days.

(21) Appl. No.: 10/935,287

(22) Filed: Sep. 8, 2004

(65) Prior Publication Data
US 2005/0051655 A1   Mar. 10, 2005

(30) Foreign Application Priority Data
Sep. 9, 2003   (JP) .............................. 2003-316729

(51) Int. Cl.
  G11B 23/107   (2006.01)
(52) U.S. Cl. ...................... 242/348; 360/132
(58) Field of Classification Search ............. 242/338.1, 242/348, 348.2; 360/132
See application file for complete search history.

(56) References Cited

U.S. PATENT DOCUMENTS 5,813,622 A   9/1998   von Alten
5,901,916 A   5/1999   McAllister et al.
6,271,991 B1   8/2001   Saliba et al.

FOREIGN PATENT DOCUMENTS

| JP | 63-251983 A | 10/1988 |
| JP | 11-025648 A | 1/1999 |
| JP | 3187022 B2 | 5/2001 |

Primary Examiner—John Q. Nguyen
(74) Attorney, Agent, or Firm—Sughrue Mion, PLLC

(57) ABSTRACT

When a recording tape cartridge is not in use, rotation of a reel, which abuts an annular rib of a floor plate of a case, is locked by a braking member which meshes together from above with an engaging gear, and a gap between the braking member and a spacer wall of a ceiling plate is filled-in by a spacer portion of a spacer member, and movement away from the annular rib is impeded. When, due to operation of a drive device, the spacer portion enters into a relief portion of the braking member which relief portion opens upwardly, the braking member is raised up by an amount corresponding to the gap formed between the braking member and the spacer wall, and meshing of the braking member and the engaging gear is cancelled. The reel thereby becomes able to rotate and to move away from the annular rib.

10 Claims, 6 Drawing Sheets

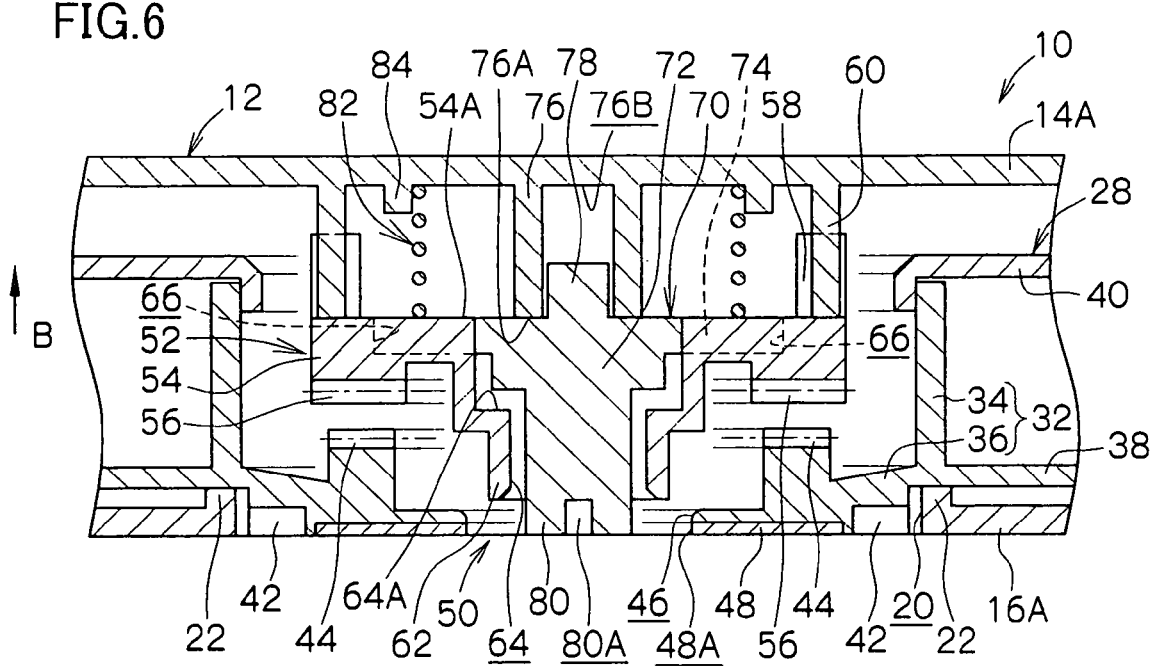
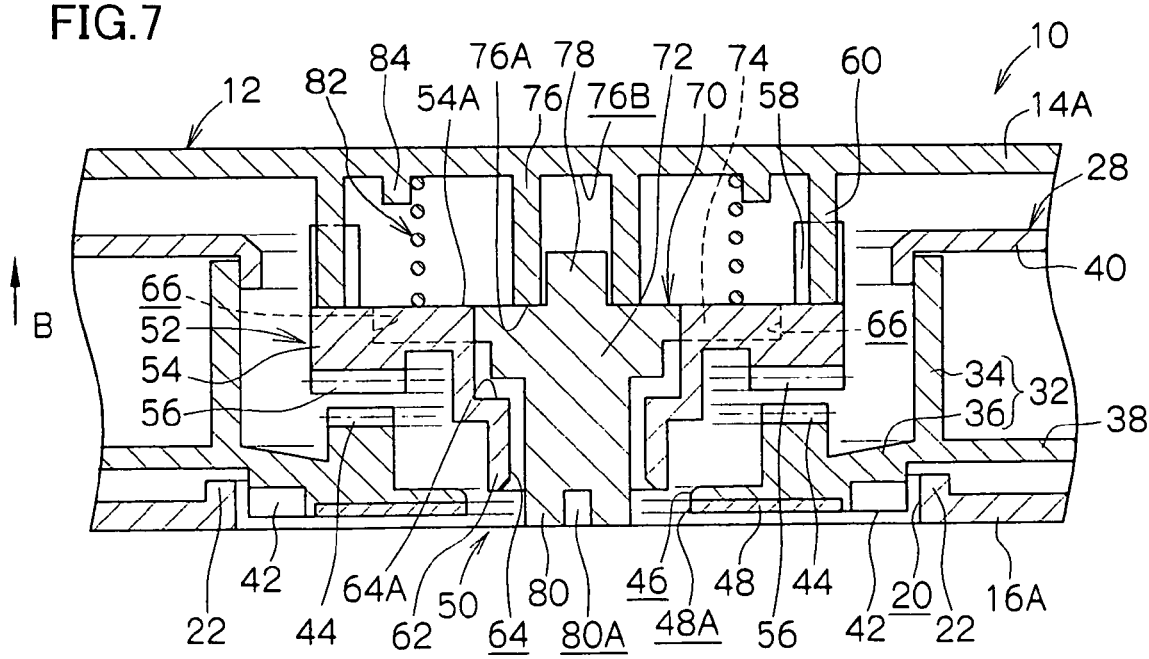

RECORDING TAPE CARTRIDGE

CROSS-REFERENCE TO RELATED APPLICATION

This application claims priority under 35 USC 119 from Japanese Patent Application No. 2003-316729 the disclosures of which are incorporated by reference herein.

BACKGROUND OF THE INVENTION

1. Field of the Invention

The present invention relates to a recording tape cartridge which rotatably accommodates a reel around which a recording tape, such as a magnetic tape or the like, is wound.

2. Description of the Related Art

Recording tapes such as magnetic tapes and the like are used as external recording media for computers and the like. Little space is required to accommodate such a recording tape at the time of storage thereof, and a large amount of information can be recorded thereon. A so-called single-reel recording tape cartridge is used in which a single reel, on which such recording tape is wound, is rotatably accommodated within a case.

Such a recording tape cartridge has a braking means so that the reel does not rotate within the case when the recording tape cartridge is not in use (see, for example, Japanese Patent Application Laid-Open (JP-A) No. 63-251983 (Patent Document 1)). This Patent Document 1 discloses the following structure: an engaging gear is provided in an annular form at the floor surface of a reel hub which is shaped as a hollow cylinder having a floor and which structures the axially central portion of a reel. A locking member, which is disc-shaped and at which is provided a braking gear which can mesh with the engaging gear, is inserted within the reel hub. The locking member is supported so as to be unable to rotate with respect to the case, and so as to be slidable in the axial direction of the reel. Due to the urging force of a compression coil spring provided between the case and the locking member, the braking gear is made to mesh with the engaging gear of the reel. In this state, the reel is pressed against the floor plate of the case by the urging force of the compression coil spring. Rotation of the reel with respect to the case is locked due to the braking gear of the locking member meshing with the engaging gear due to this urging force.

In this structure, a pass-through hole is formed in the floor portion of the reel hub. When a releasing portion of a drive device enters in from this pass-through hole and pushes the locking member upward against the urging force of the compression coil spring, the meshed-together state of the braking gear and the engaging gear is cancelled, and rotation of the reel with respect to the case is permitted. The releasing portion of the drive device is provided at a rotating shaft together with a driving gear which meshes with a reel gear formed at an end surface of the reel hub. As the driving gear meshes with the reel gear, the releasing portion pushes the locking member upward. Accordingly, in this structure, when the rotating shaft drives and rotates the reel, the locking member, which cannot rotate with respect to the case, and the releasing portion, which rotates integrally with the rotating shaft, slidingly-contact one another while being pressed against one another due to the urging force of the compression coil spring. In order to reduce the resistance to rotation which arises accompanying this sliding-contact, the locking member and the releasing portion are both formed of resin materials.

Further, a structure which is similar to that disclosed in above-described Patent Document 1 has been conceived of in which a releasing member, which rotates integrally with the reel, is provided between the locking member and the floor portion of the reel hub (see, for example, Japanese Patent No. 3187022 (Patent Document 2)). Specifically, due to the releasing member being pushed by a releasing portion of a drive device, the releasing member is pushed upward together with the locking member against the urging force of the compression coil spring. In this way, the locking member is pushed upward by the releasing portion via the releasing member, and the locked state of the reel is cancelled. In this structure, due to the releasing member rotating integrally with the reel at the time when the reel is driven to rotate, the releasing portion and the releasing member do not slidingly-contact one another, and the releasing member and the locking member slidingly-contact one another.

Moreover, a structure is known in which, at the time when the reel is driven to rotate, the locking member does not slidingly-contact any other portion (see, for example, JP-A No. 11-25648 (Patent Document 3)). In this structure, the engaging gear is formed at the outer peripheral portion of a flange of the reel. Rotation of the reel is locked due to two locking members, each of which is rotatably supported within the case and is urged in a direction of meshing with the engaging gear, meshing together with the engaging gear. Further, when this recording tape cartridge is loaded into a drive device, the locking members are pushed by releasing portions of the drive device, and rotate against the aforementioned urging force. In this way, the meshing together of the locking members and the engaging gear is released, and rotation of the reel is permitted. These releasing portions are respectively provided independently of the rotating shaft, and push the locking members due to the loading of the recording tape cartridge (the case) into the drive device or the lowering of the recording tape cartridge (the case). In this structure, the compression coil spring, which is for pressing the reel against the case or the rotating shaft, is connected to the reel via a bearing. Relative rotation between the compression coil spring and the reel is absorbed by the bearing.

However, in the recording tape cartridges relating to the above-described structures, when the recording tape is not being used, the reel is held with respect to the case by being pressed against the floor plate of the case by the urging force of the compression coil spring. Therefore, when force resisting the urging force of the compression coil spring is applied, upward and downward movement of the reel within the case cannot be impeded. Thus, for example, if the region where the reel gear is formed at the reel, which region is exposed from the case (i.e., the outer surface of the floor portion of the reel hub), were to be pushed or if impact of a drop were to be applied to this region, the reel would joggle greatly within the case, which could be a cause of damage to the recording tape whose one end portion is held at the case via a leader member. Further, if the reel joggles within the case, the locking of the rotation of the reel by the locking member is released, which is a cause of the winding (the wound state) of the recording tape becoming tighter or looser.

SUMMARY OF THE INVENTION

In view of the aforementioned, an object of the present invention is to provide a recording tape cartridge in which a reel can be prevented from moving greatly in an axial direction within a case at times when the recording tape cartridge is not being used.

A recording tape cartridge of a first aspect of the present invention has: a case at which a ceiling plate and a floor plate are connected by a peripheral wall; a reel around which a recording tape is wound, the reel accommodated within the case so as to be able to approach and move away from the floor plate; an engaging portion provided at the reel, and facing the ceiling plate; a rotation locking member provided so as to be unable to rotate with respect to the case and so as to be able to approach and move away from the ceiling plate, and when the recording tape cartridge is not in use, the rotation locking member engages with the engaging portion of the reel which is abutting the floor plate and impedes rotation of the reel, and the rotation locking member is operated by a drive device and moves away from the engaging portion and allows the reel to rotate and to move away from the floor plate; and a spacer member provided between the ceiling plate and the rotation locking member, and when the recording tape cartridge is not in use, the spacer member fills-in a gap between the ceiling plate and the rotation locking member, and before the rotation locking member is operated by the drive device, the spacer member is operated by the drive device and is pulled-out from the gap.

In the recording tape cartridge of the first aspect, when the recording tape cartridge is not being used, the rotation locking member, which cannot rotate with respect to the case, engages with the engaging portion, which faces toward the ceiling plate, of the reel which is abutting the floor plate (including the fixed portion provided at the floor plate) within the case. Rotation of the reel with respect to the case is thereby impeded. Further, in this state, the spacer member (together with other portions of the case) fills-in the gap between the rotation locking member and the ceiling plate, and the reel moving away from the floor plate is impeded.

When, from this state, the drive device operates the spacer member and the spacer member is pulled-out from the aforementioned gap (the gap is formed between the rotation locking member and the ceiling plate due to the movement of the spacer member), movement of the rotation locking member toward the ceiling plate, i.e., the rotation locking member moving away from the engaging portion of the reel, is possible. Then, when the drive device operates the rotation locking member and the rotation locking member moves to the releasing position, the rotation locking member moves away from the engaging portion, the reel becomes able to rotate with respect to the case and to move away from the floor plate, and the reel moves away from the floor plate and is driven to rotate without contacting the case.

Here, because the spacer member, which fills in the gap between the ceiling plate and the rotation locking member when the recording tape cartridge is not being used, is provided, the reel does not move greatly in the axial direction within the case when the recording tape cartridge is not in use. Accordingly, for example, even if force in the axial direction were to be applied to the reel due to the impact of a drop or an erroneous operation or the like, the recording tape wound on the reel is protected. Further, because movement of the rotation locking member, together with that of the reel, within the case is restricted, it is also possible to prevent the locking of the rotation of the reel from being released due to the aforementioned impact of a drop or the like.

In this way, in the recording tape cartridge of the first aspect, it is possible to prevent the reel from moving greatly in the axial direction within the case when the recording tape cartridge is not in use. Note that it suffices for the engaging portion, which faces the ceiling plate, to be provided such that the locking member engages the engaging portion at the ceiling plate side. For example, the engaging portion may be provided at an incline with respect to the ceiling plate.

A recording tape cartridge relating to a second aspect of the present invention has: a reel having a hub which is formed in a shape of a cylindrical tube having a floor portion and around whose outer peripheral portion a recording tape is wound, and an engaging portion provided at an inner surface of the floor portion of the hub; a case at which a ceiling plate and a floor plate are connected by a peripheral wall, the case accommodating the reel, whose engaging portion is facing the ceiling plate, such that the reel can approach and move away from the floor plate; a rotation locking member provided so as to be unable to rotate with respect to the case and so as to be able to approach and move away from the ceiling plate, and when the recording tape cartridge is not in use, the rotation locking member engages with the engaging portion of the reel which is abutting the floor plate and impedes rotation of the reel, and the rotation locking member is operated by a drive device and moves away from the engaging portion and allows the reel to rotate and to move away from the floor plate; a relief portion provided at the rotation locking member and opening toward the ceiling plate; and a spacer member provided between the ceiling plate and the rotation locking member, and when the recording tape cartridge is not in use, the spacer member fills-in a gap between the ceiling plate and an end surface of the rotation locking member, and before the rotation locking member is operated by the drive device, the spacer member is operated by the drive device and enters into the relief portion.

In the recording tape cartridge of the second aspect, when the recording tape cartridge is not being used, the rotation locking member, which cannot rotate with respect to the case, engages with the engaging portion which is provided at the inner surface of the floor portion, which faces toward the ceiling plate, of the hub of the reel which is abutting the floor plate (including the fixed portion provided at the floor plate) within the case. Rotation of the reel with respect to the case is thereby impeded. Further, in this state, the spacer member (together with other portions of the case) fills-in the gap between the rotation locking member and the ceiling plate, and the reel moving away from the floor plate is impeded or markedly restricted.

When, from this state, the drive device operates the spacer member and the spacer member enters into the relief portion of the rotation locking member, a gap, which permits movement of the rotation locking member toward the ceiling plate, is formed between the rotation locking member and the ceiling plate, and movement of the rotation locking member toward the ceiling plate, i.e., the rotation locking member moving away from the engaging portion of the reel, is possible. Then, when the drive device operates the rotation locking member and the rotation locking member moves to the releasing position at which the rotation locking member is away from the engaging portion, the reel is able to rotate with respect to the case and to move away from the floor plate, and the reel moves away from the floor plate and is driven to rotate without contacting the case.

Here, because the spacer member, which fills in the gap between the ceiling plate and the rotation locking member when the recording tape cartridge is not being used, is provided, the reel does not move greatly in the axial direction within the case when the recording tape cartridge is not in use. Accordingly, for example, even if force in the axial direction were to be applied to the reel due to the impact of a drop or an erroneous operation or the like, the recording tape wound on the reel is protected. Further, because movement of the rotation locking member, together with that of the reel, in the axial direction of the reel and within the case is restricted, it is also possible to prevent the locking of the rotation of the reel from being released due to the aforementioned impact of a drop or the like.

The relief portion, into which the spacer member enters, is provided at the rotation locking member. Therefore, by a small moving stroke, the spacer member forms the aforementioned gap (is pulled out from the gap) and can permit movement of the rotation locking member toward the ceiling plate. Thus, the function of canceling the state in which axial direction movement of the reel is impeded can be realized by a relatively compact structure.

In this way, in the recording tape cartridge of the second aspect, it is possible to prevent the reel from moving greatly in the axial direction within the case when the recording tape cartridge is not in use. Note that the relief portion may be structured, for example, as a concave portion, a cut-out portion, a hole (a pass-through hole), or the like.

A recording tape cartridge of a third aspect of the present invention has the feature that, in the recording tape cartridge of the second aspect, the spacer member is structured to have an operation portion which is provided coaxially within the hub and is operated by the drive device and rotates around an axis of the hub, and a spacer portion which enters into the relief portion due to rotation of the operation portion.

In the recording tape cartridge of the third aspect, when the operation portion of the spacer member, which operation portion is disposed coaxially with the hub, is rotated by a drive device, the spacer portion slides along the surface of the rotation locking member which surface faces the ceiling plate, while the spacer portion rotates around the axial center of the reel. When this spacer portion reaches the region of the rotation locking member where the relief portion is formed, the spacer portion enters into the relief portion. In this way, the function of canceling the state in which axial direction movement of the reel is impeded can be realized by a simple structure.

A recording tape cartridge of a fourth aspect of the present invention has the feature that, in the recording tape cartridge of the third aspect, a plurality of the spacer portions and the relief portions are provided.

A recording tape cartridge of a fifth aspect of the present invention has the feature that, in the recording tape cartridge of the third aspect, an engaging portion that engages with the drive device is provided at an end portion of the operation portion of the spacer member.

A recording tape cartridge of a sixth aspect of the present invention has the feature that, in the recording tape cartridge of the second aspect, the spacer member is provided between a wall portion, which is provided at the ceiling plate in protruding manner toward the rotation locking member, and the rotation locking member, and when the recording tape cartridge is not in use, the spacer member fills-in the gap between an end portion of the wall portion and the end surface of the rotation locking member.

A recording tape cartridge of a seventh aspect of the present invention has the feature that, in the recording tape cartridge of the second aspect, a stopper wall is provided at an one end, in rotating direction of the rotation locking member, of an opening of the relief portion.

A recording tape cartridge relating to an eighth aspect of the present invention has: a case at which a ceiling plate and a floor plate are connected by a peripheral wall; a reel around which a recording tape is wound, the reel accommodated within the case so as to be able to approach and move away from the floor plate; an engaging portion provided at the reel, and facing the ceiling plate; a rotation locking member provided so as to be unable to rotate with respect to the case and so as to be able to approach and move away from the ceiling plate, and when the recording tape cartridge is not in use, the rotation locking member engages with the engaging portion of the reel which is abutting the floor plate and impedes rotation of the reel, and the rotation locking member is operated by a drive device and moves away from the engaging portion and allows the reel to rotate and to move away from the floor plate; and a spacer member provided between the ceiling plate and the rotation locking member, and when the recording tape cartridge is not in use, the spacer member fills-in a gap between the ceiling plate and the rotation locking member to restrict movement of the rotation locking member in axial direction such that movement of the reel away from the floor plate is impeded, and before the rotation locking member is operated by the drive device, the spacer member is operated by the drive device and is pulled-out from the gap to allow movement of the rotation locking member within the gap in the axial direction such that movement of the reel away from the floor plate is allowed.

A recording tape cartridge of a ninth aspect of the present invention has the feature that, in the recording tape cartridge of the eighth aspect, the recording tape cartridge further comprises a relief portion, provided at one of the rotation locking member side or the ceiling plate side, that can accommodate at least a portion of the spacer member.

A recording tape cartridge of a tenth aspect of the present invention has the feature that, in the recording tape cartridge of the eighth aspect, the spacer member is structured to have an operation portion which is provided coaxially within a hub of the reel and is operated by the drive device and rotates around an axis of the hub, and a spacer portion which enters into the relief portion due to rotation of the operation portion.

As described above, the recording tape cartridge relating to the present invention has the excellent effect that the reel can be prevented from moving greatly in the axial direction within the case at times when the recording tape cartridge is not in use.

BRIEF DESCRIPTION OF THE DRAWINGS

FIG. 1A is a perspective view seen from above and FIG. 1B is a perspective view seen from below.

FIG. 2A is a sectional view of a state in which rotation of a reel is locked and FIG. 2B is a sectional view of a state in which locking of the rotation of the reel is released.

FIG. 6 is an enlarged sectional view of main portions, showing a rotation permitting state of the lock mechanism structuring the recording tape cartridge relating to the embodiment of the present invention.

FIG. 7 is an enlarged sectional view of main portions, showing a state in which the reel structuring the recording tape cartridge relating to the embodiment of the present invention is rotating.

FIG. 8A is an expanded view of a state in which a spacer member is positioned at a lock maintaining position and FIG. 8B is an expanded view of a state in which the spacer member is positioned at a release preparation position.

DETAILED DESCRIPTION OF THE INVENTION

A recording tape cartridge 10 relating to an embodiment of the present invention will be described on the basis of FIGS. 1A and 1B through FIGS. 8A and 8B.

(Overall Structure of Recording Tape Cartridge)

Figure 1A:
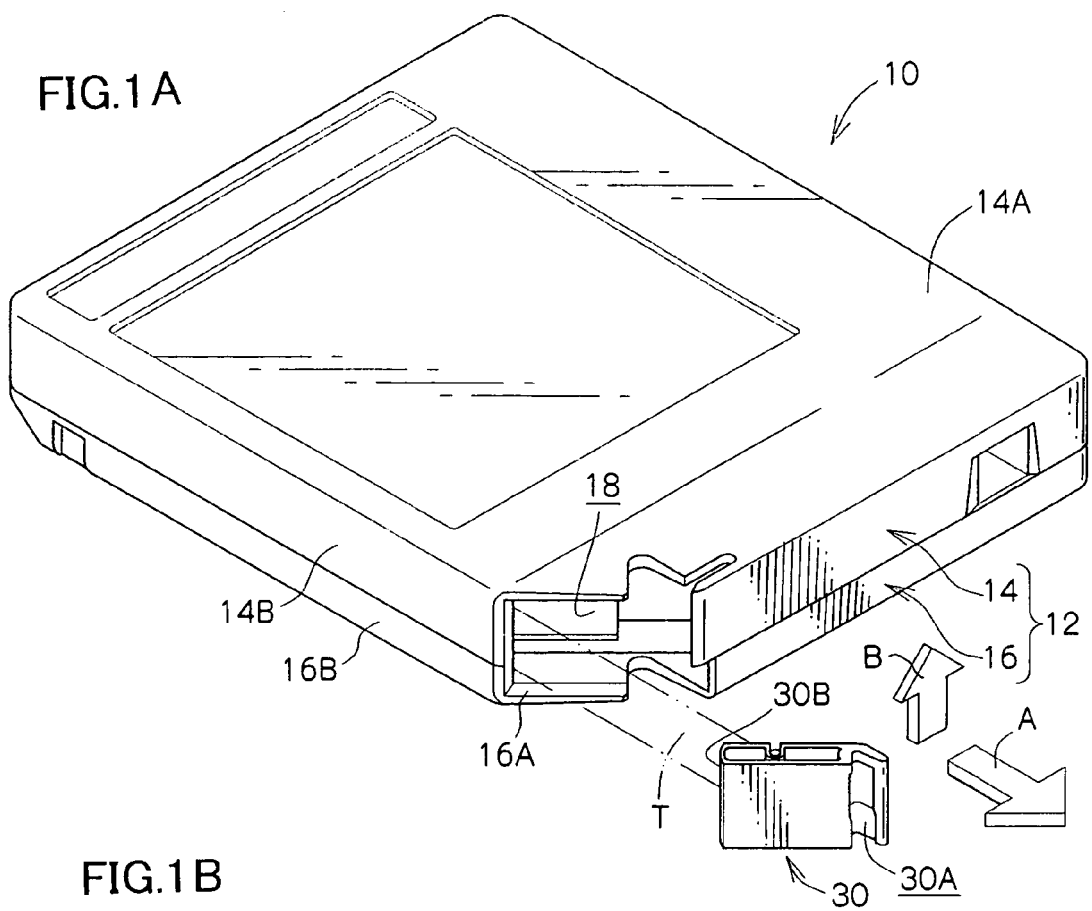
FIGS. 1A and 1B are drawings showing the exterior of a recording tape cartridge relating to an embodiment of the present invention, where
Figure 1B:
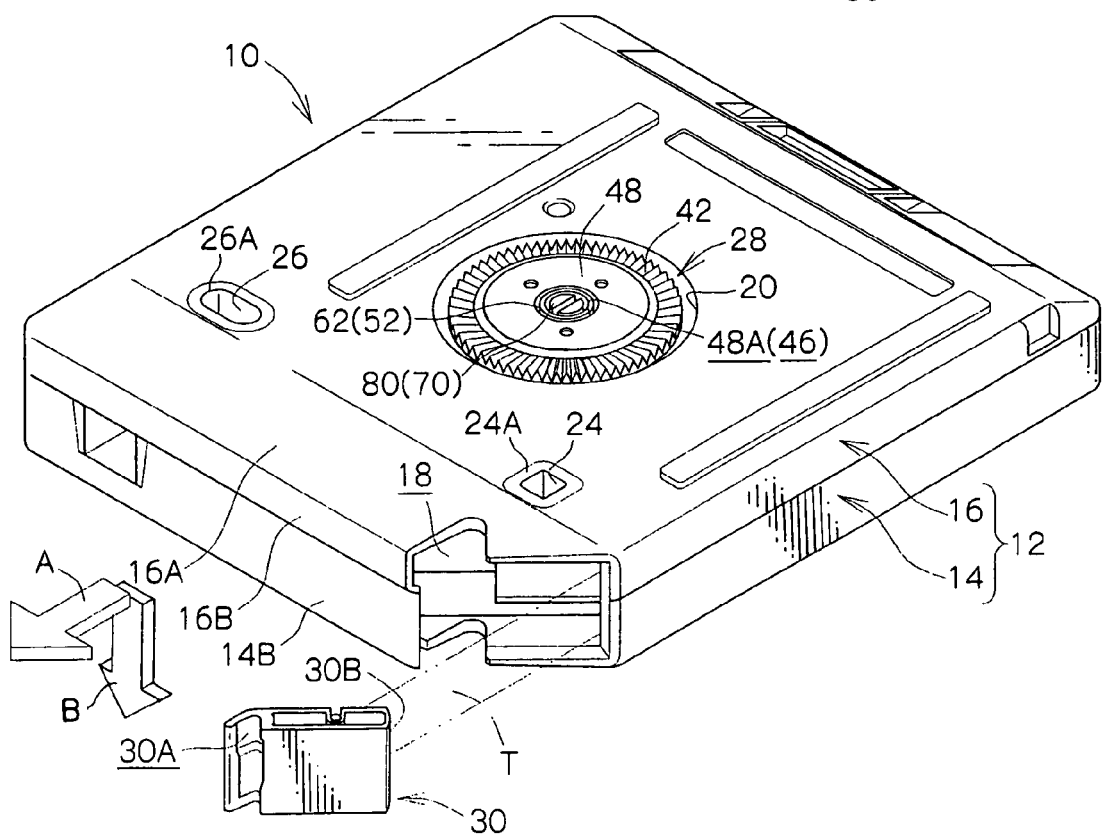
Figure 2A:
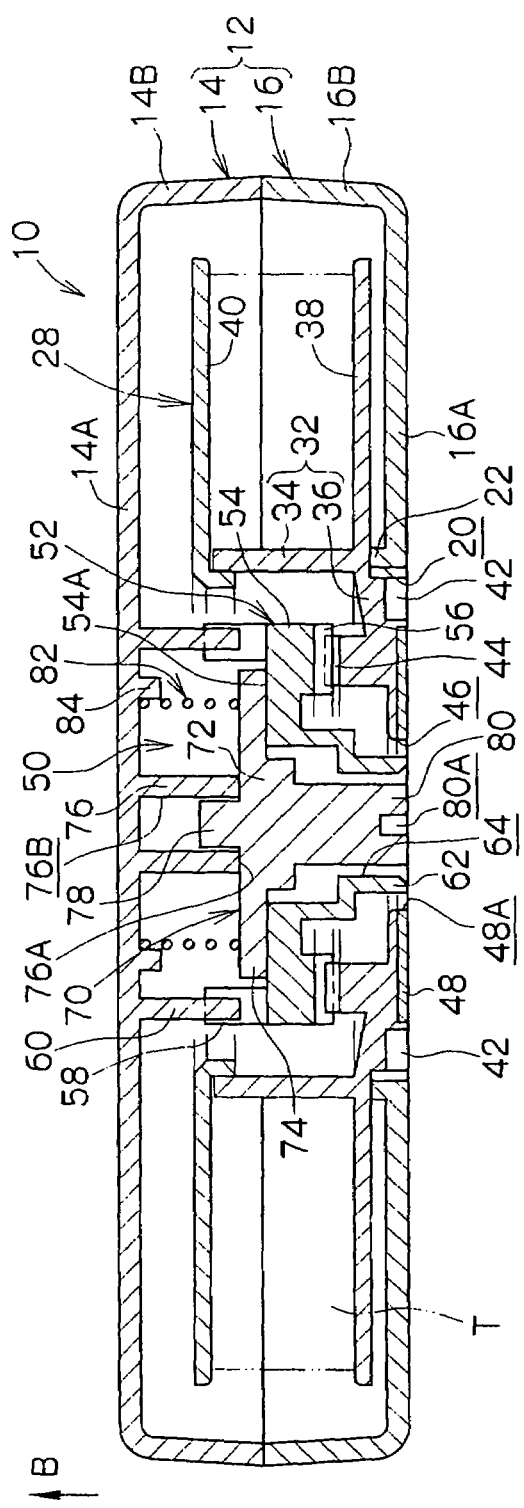
FIGS. 2A and 2B are sectional views of the recording tape cartridge relating to the embodiment of the present invention, where
Figure 2B:
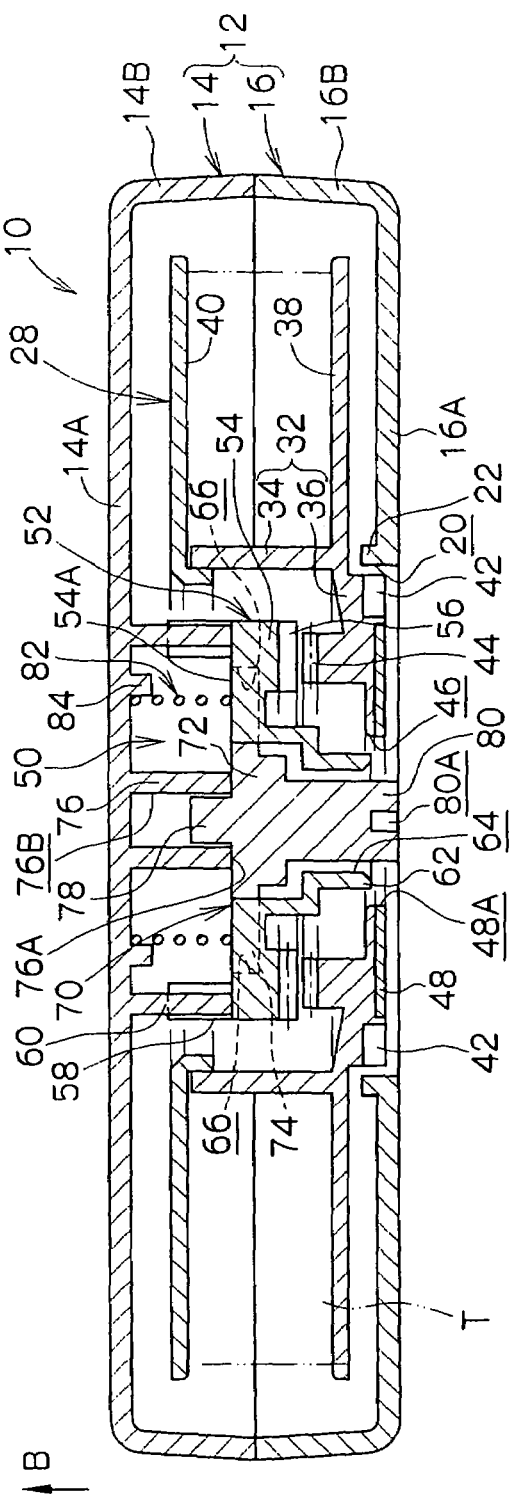

A perspective view, as seen from above and at an incline, of the recording tape cartridge 10 is shown in FIG. 1A. A perspective view, as seen from below and at an incline, of the recording tape cartridge 10 is shown in FIG. 1B. Sectional views of the recording tape cartridge 10 are shown in FIGS. 2A and 2B. Note that arrow A used appropriately in the respective drawings indicates the direction of loading the recording tape cartridge 10 into a drive device, and for convenience of explanation, the side in the direction of arrow A is the front side. Further, the direction indicated by arrow B is upward.

As shown in these drawings, the recording tape cartridge 10 has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 10 into a drive device, the ceiling plate 14A, the peripheral wall 14B, the floor plate 16A and the peripheral wall 16B are respectively cut away, such that an opening 18, which is inclined with respect to the loading direction, is formed. A gear opening 20, which is circular and passes through the floor plate 16A, is formed in the substantially central portion of the floor plate 16A. The gear opening 20 is for exposing a reel gear 42 which will be described later. An annular rib 22 formed in a tapered shape projects toward the inner side of the case 12 at the floor plate 16A at the edge of the gear opening 20, and is for positioning of a reel 28 which will be described later.

A pair of positioning holes 24, 26 are formed in a vicinity of the front end of the outer surface of the floor plate 16A of the case 12. The pair of positioning holes 24, 26 are formed in the shapes of bags within projections (not illustrated) which stand erect from the floor plate 16A toward the interior of the case 12. The positioning holes 24, 26 are disposed so as to be separated from one another on an imaginary line which is orthogonal to the loading direction. The positioning hole 24, which is the positioning hole which is closer to the opening 18, is formed in a substantially square shape, as seen in bottom view, which circumscribes a positioning pin of a drive device. The positioning hole 26 is a long hole whose longitudinal direction runs along the aforementioned imaginary line, and whose width corresponds to the diameter of a positioning pin.

In this way, when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within the drive device.

The portions of the floor plate 16A around the positioning holes 24, 26 are positioning surfaces 24A, 26A which are finished so as to be smoother than the other portions of the floor plate 16A (the design surface of the floor plate 16A). When the positioning pins are inserted into the positioning holes 24, 26, the positioning surfaces 24A, 26A abut positioning surfaces of the drive device which are provided around the positioning pins. In this way, the vertical direction positioning of the recording tape cartridge 10 within the drive device is carried out.

As shown in FIG. 2A, the reel 28, which will be described in detail later, is rotatably accommodated within the above-described case 12. Only one reel 28 is provided. A magnetic tape T serving as a recording tape is wound on the reel 28. A leader block 30, which serves as a pull-out member, is attached to the distal end of the magnetic tape T.

When the recording tape cartridge 10 is not being used, the leader block 30 is accommodated and held at the inner side of the opening 18 of the case 12. In this state, the leader block 30 closes the opening 18, and impedes entry of dust and the like into the case 12. An engaging recess 30A is formed in the distal end of the leader block 30. When the magnetic tape T is to be pulled-out within the drive device, a pull-out means, which engages with the engaging recess 30A, pulls the leader block 30 out of the case 12 and guides the leader block 30 to a take-up reel of the drive device. Moreover, the end surface of the leader block 30 at the side opposite the engaging recess 30A is an arc-shaped surface 30B. The arc-shaped surface 30B is fit into the take-up reel and forms a portion of the take-up surface around which the magnetic tape T is taken-up.

(Structure of Reel)

Next, the reel 28 will be described. As shown in FIGS. 2A and 2B, the reel 28 has a reel hub 32 which serves as a hub and which structures the axially central portion of the reel 28. The reel hub 32 is formed substantially in the shape of a hollow cylinder having a floor, and has a cylindrical portion 34 around whose outer peripheral surface the magnetic tape T is wound, and a floor portion 36 which closes the bottom portion of the cylindrical portion 34. A lower flange 38 extends coaxially and integrally at the radial direction outer side of the reel hub 32 from a vicinity of the floor portion 36 side end portion (i.e., the lower end portion) of the reel hub 32.

On the other hand, an upper flange 40, which is formed in correspondence with the lower flange 38, is joined to the upper end portion of the reel hub 32. In this way, at the reel 28, the magnetic tape T is wound around the outer peripheral surface of the cylindrical portion 34 of the reel hub 32, between the opposing surfaces of the lower flange 38 and the upper flange 40, and the cylindrical portion 34 is open toward the top.

The reel gear 42 is formed on the whole in the shape of a ring which is coaxial with the reel 28, at the bottom end surface of the floor portion 36 of the reel hub 32 (i.e., the outer surface which is positioned further downward than the lower flange 38). The reel gear 42 can mesh with a driving gear (not illustrated) which is provided in an annular form at the outer peripheral portion of the distal end of a rotating shaft of a drive device.

On the other hand, an engaging gear 44, which serves as an engaging portion, is provided in a vicinity of the outer periphery of the top surface (the inner surface) of the floor portion 36 of the reel hub 32. The engaging gear 44 is formed in the shape of a ring which is coaxial with the reel 28, and respective teeth of the engaging gear 44 are directed upward (toward the ceiling plate 14A). The engaging gear 44 can mesh with a braking gear 56 of a braking member 52 which will be described later. Note that the engaging gear 44 may be provided by being divided into plural portions which are disposed on a circumference which is coaxial with the reel 28. Further, the engaging gear 44 may be formed along a conical surface which is inclined with respect to the axis of the reel 28.

A pass-through hole 46 is provided in the axially central portion of the floor portion 36 of the reel hub 32 so as to pass through along the direction of plate thickness of the floor portion 36. The pass-through hole 46 is for exposing a release operation portion 62 of the braking member 52 and an operation shaft portion 80 of a spacer member 70 which will be described later.

The portions of the above-described reel 28, other than the upper flange 40, are formed integrally by resin molding. A reel plate 48, which is formed of a magnetic material and in the shape of a disc, is provided integrally and coaxially by insert molding at the inner side of the reel gear 42 at the bottom surface of the floor portion 36 of the reel hub 32. The reel plate 48 is for attraction and holding (chucking) by a magnet (not illustrated) which is provided at the radial direction inner side of the driving gear at the rotating shaft. A through hole 48A is formed in the axially central portion of the reel plate 48 in correspondence with the pass-through hole 46.

Figure 4:
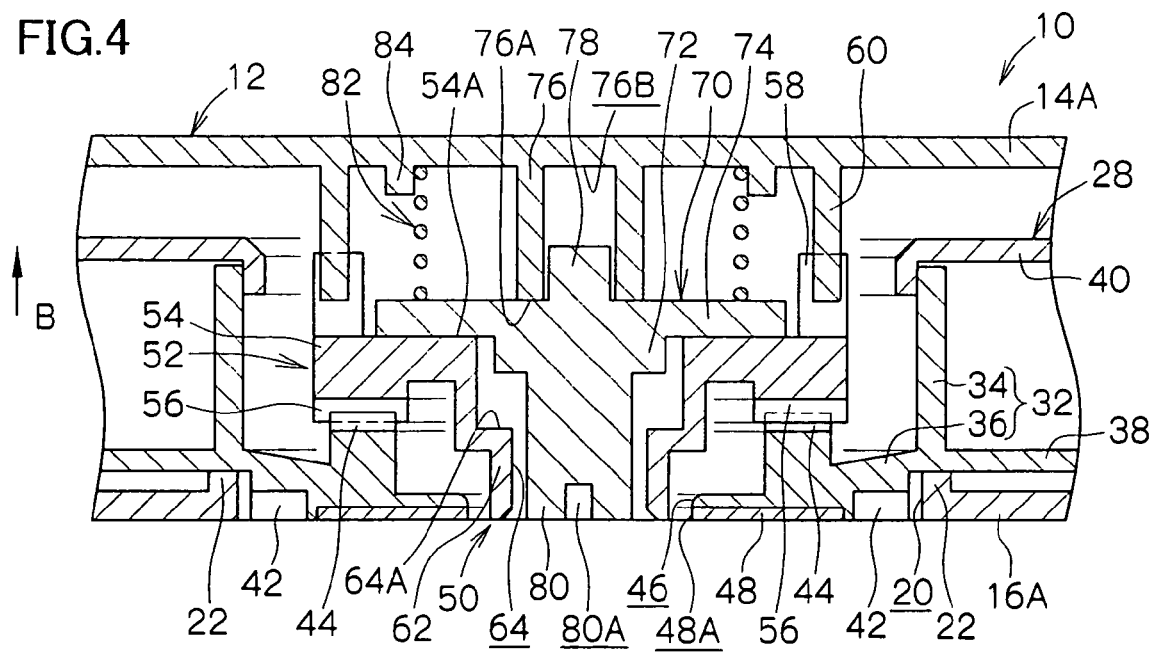
FIG. 4 is an enlarged sectional view of main portions, showing a lock maintaining state of the lock mechanism structuring the recording tape cartridge relating to the embodiment of the present invention.

The reel 28 is accommodated in the case 12, and when the recording tape cartridge 10 is not in use, the reel 28 is set on the annular rib 22. Specifically, as shown in FIG. 2A and FIG. 4, the portion of the reel 28, which portion is the border between the floor portion 36 and the lower flange 38, abuts the top end surface of the annular rib 22. Due to the portion of the reel 28 which projects further than the lower flange 38 being set in at the inner side of the annular rib 22, radial direction movement of the reel 28 is restricted. In the present embodiment, the top end surface of the annular rib 22, which is formed integrally with (provided fixedly at) the floor plate 16A, corresponds to the "floor plate" of the case 12.

In this state, the reel 28 is exposed from the gear opening 20, without the reel gear 42 and the reel plate 48 projecting out from the outer surface (the bottom surface) of the floor plate 16A (see FIG. 1B). Namely, the reel gear 42 and the reel plate 48 face the exterior of the case 12 from the gear opening 20. In this way, operation, i.e., chucking (holding) and driving/rotating, of the reel 28 from the exterior of the case 12 is possible.

The height of the reel 28 from the bottom surface of the lower flange 38 to the top surface of the upper flange 40 is sufficiently smaller than the height of the case 12 from the top end of the annular rib 22 to the ceiling plate 14A, such that axial direction movement of the reel 28 within the case 12 is possible. When the magnetic tape T is drawn-out or rewound, the reel 28 rotates in a state in which the reel 28 is moved upward with respect to the case 12 and is moved away from the annular rib 22. Specifically, in the state in which the reel gear 42 is meshed together with the driving gear of the rotating shaft and the reel plate 48 is attracted to and held by the magnet without contacting the magnet, the reel 28 is driven to rotate around the axial center without contacting the case 12 while the reel 28 is raised up by the rotating shaft within the case 12.

(Structure of Lock Mechanism)

As shown in FIGS. 2A and 2B, the recording tape cartridge 10 is provided with a lock mechanism 50 which, when the magnetic tape T is not being used, restricts axial direction movement of the reel 28 and impedes rotation of the reel 28 with respect to the case 12, and which, when the recording tape cartridge 10 is loaded in a drive device, permits rising-up and rotation of the reel 28 with respect to the case 12. The structure of the lock mechanism 50 will be described in detail hereinafter.

Figure 3:
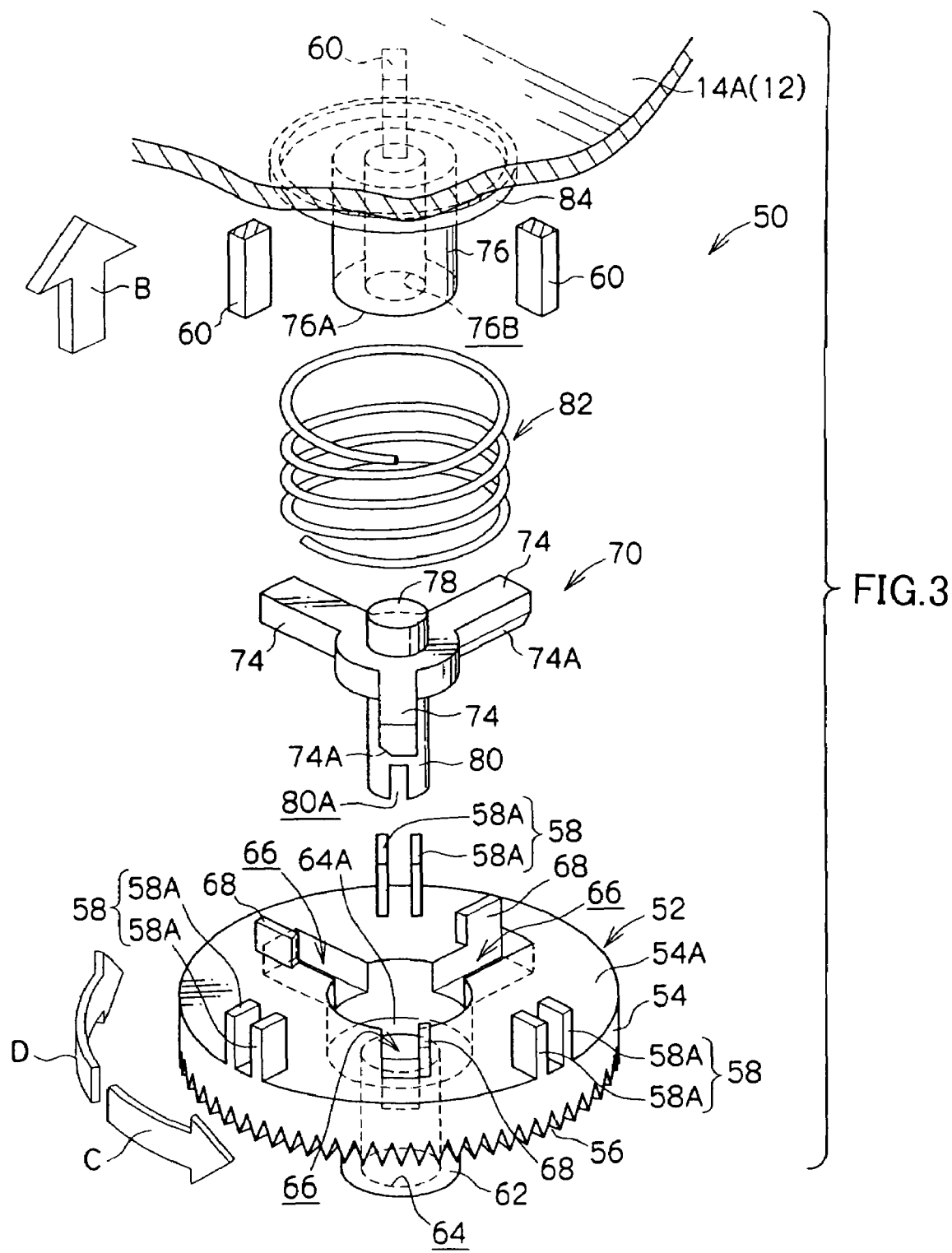
FIG. 3 is an exploded perspective view of a lock mechanism structuring the recording tape cartridge relating to the embodiment of the present invention.

As shown in FIG. 3, the lock mechanism 50 has the braking member 52 which serves as a rotation locking member. The braking member 52 has a disc portion 54 which is formed substantially in the shape of a disc. The braking gear 56 is provided at the outer peripheral portion of the bottom surface of the disc portion 54, along the entire periphery thereof. Namely, the braking gear 56 is formed overall in an annular shape with the respective teeth thereof facing downward. The braking gear 56 can mesh with the engaging gear 44 of the reel 28.

Plural (three in the present embodiment) guide portions 58 are provided at uniform intervals in the peripheral direction, on a top surface 54A of the disc portion 54 in a vicinity of the outer periphery thereof. Each of the guide portions 58 is structured by a pair of guide walls 58A. The pair of guide walls 58A oppose one another across an imaginary line which coincides with the radial direction of the disc portion 54. Restricting ribs 60, which stand erect from the inner surface of the ceiling plate 14A of the case 12, slidingly enter-in between the guide walls 58A of the respective guide portions 58.

In this way, relative movement of the braking member 52 with respect to the case 12, other than movement in the vertical direction, is restricted. Namely, rotation of the braking member 52 with respect to the case 12 is impeded, and the braking member 52 can move reciprocatingly in the vertical direction while being guided by the restricting ribs 60 at the respective guide portions 58.

The braking member 52 is inserted and provided in the reel hub 32 (the cylindrical portion 34) of the reel 28, and the braking member 52 can be set at a rotation locking position (see FIG. 2A) at which the braking gear 56 is meshed together with the engaging gear 44 which is provided at the floor portion 36 of the reel 28 which is set on the annular rib 22, and a releasing position (see FIG. 2B), at which the braking member 52 is moved away from the engaging gear 44 and releases the meshing-together of the engaging gear 44 and the braking gear 56.

Due to rotation of the braking member 52 with respect to the case 12 being impeded, the braking member 52 impedes rotation of the reel 28 with respect to the case 12 when the braking member 52 is positioned at its rotation locking position, and when the braking member 52 is positioned at the releasing position, the braking member 52 permits rotation of the reel 28 with respect to the case 12. Note that the releasing position is set as a position of the braking member 52 in the vertical direction (see FIG. 7) such that the state in which the meshing-together of the braking gear 56 with the engaging gear 44 is released is maintained in the state in which the reel 28 is moved away from the annular rib 22 as described above. Namely, the braking member 52, which is positioned at the releasing position, also permits movement of the reel 28 away from the annular rib 22.

The release operation portion 62, which is formed substantially in the shape of a hollow cylinder, projects from the axially central portion of the bottom surface of the disc portion 54. An insert-through hole 64 is provided in the release operation portion 62 and the disc portion 54, so as to pass through the respective axially central portions thereof and in the vertical direction. In the present embodiment, the upper side portion of the insert-through hole 64 has a larger diameter than that of the lower side portion thereof, and a step portion 64A is formed therebetween. The outer diameter of the lower portion of the release operation portion 62 is smaller than the inner diameter of the pass-through hole 46 (the through hole 48A) of the reel 28.

Relief recesses 66, which serve as relief portions which open upwardly at the top surface 54A of the disc portion 54, are provided in the disc portion 54. The plural (three in the present embodiment) relief recesses 66 are provided at uniform intervals in the peripheral direction of the disc portion 54. The respective relief recesses 66 are formed in substantially rectangular shapes in plan view, whose longitudinal directions run along central lines (the radial direction) passing through the peripheral direction intermediate portions between the guide portions 58 at the disc portion 54. The one end portion of each relief recess 66, which one end portion is near to the axial center of the disc portion 54, is continuous with the insert-through hole 64. Further, the longitudinal dimensions of the relief recesses 66 are determined such that the other end portions thereof are positioned at the inner side of an imaginary circle which connects the end portions (the inner edges) of the guide portions 58 which end portions are near to the axial center of the disc portion 54. In this way, spacer portions 74 of the spacer member 70 which will be described later do not interfere with the guide portions 58.

Stopper walls 68 stand erect from the top surface 54A of the disc portion 54, along one edge portions at the same side (the edge portion at the arrow C side in FIG. 3) in the transverse directions of the relief recesses 66 (the peripheral direction of the disc portion 54). The length of each of the stopper walls 68 (the length thereof in the longitudinal direction of the relief recess 66) is determined so as to not interfere with a compression coil spring 82 which will be described later.

The lock mechanism 50 has the spacer member 70. The spacer member 70 has a base portion 72 which is formed substantially in the shape of a disc and which can be inserted in and removed from the insert-through hole 64 of the braking member 52. The spacer portions 74 extend outwardly in the radial direction from the outer peripheral surface of the base portion 72. The spacer portions 74 are provided at uniform intervals in the peripheral direction of the base portion 72, and such that their longitudinal directions run along the radial direction of the base portion 72. The spacer portions 74 are formed so as to be able to enter into respectively different ones of the relief recesses 66. Further, as shown in FIG. 8 as well, at each spacer portion 74, the bottom portion of the surface facing toward the arrow D side is formed in a taper shape, so as to form a taper surface 74A which is directed downwardly and toward the arrow D side. In the present embodiment, the heights (thicknesses) of the spacer portions 74 correspond to the depths of the relief recesses 66.

In this way, the spacer member 70 can be set at a lock maintaining position (see FIGS. 2A and 4), at which the bottom surfaces of the spacer portions 74 abut the top surface 54A of the disc portion 54 at the braking member 52, and a release preparation position (see FIG. 5), at which the spacer portions 74 have entered into the respective relief recesses 66. Further, a spacer wall 76 stands erect from the ceiling plate 14A of the case 12. A bottom end surface 76A of the spacer wall 76 abuts the top surface of the base portion 72 of the spacer member 70 which is positioned at the lock maintaining position.

Namely, in the present embodiment, the spacer wall 76 corresponds to the ceiling plate in the present invention, and the spacer member 70 which is positioned at the rotation locking position fills in the gap between the braking member 52 and the spacer wall 76, such that the spacer member 70 which is positioned at the release preparation position forms a gap G (see FIG. 5) between the reel 28 and the spacer wall 76. Further, in the present embodiment, the spacer wall 76 is formed in the shape of a cylindrical tube which is coaxial with the reel 28 (the annular rib 22). Note that the outer diameter of the spacer wall 76 is sufficiently smaller than the diameter of an imaginary circle which connects the inner edges of the stopper walls 68 at the braking member 52, so that the spacer wall 76 does not interfere with the stopper walls 68 of the braking member 52 which is positioned at the releasing position. Further, when the spacer member 70 is positioned at the release preparation position, the base portion 72 does not abut the step portion 64A of the insert-through hole 64.

A guide projection 78, which is formed substantially in the shape of a solid cylinder, projects from the axially central portion of the top surface of the base portion 72. The guide projection 78 is slidably inserted in a guide hole 76B formed within the spacer wall 76. In this way, the spacer member 70 moves upward and downward along the axis of the reel 28 while being guided by the spacer wall 76, so as to be set at the lock maintaining position and the release preparation position. Further, the spacer member 70 can rotate relative to the case 12 in a state in which the spacer member 70 is centered by the spacer wall 76.

The operation shaft portion 80, which serves as an operation portion, projects from the bottom surface of the base portion 72. The operation shaft portion 80 is formed in the shape of a solid cylinder which can be inserted through the insert-through hole 64. A slot-shaped engagement groove 80A is formed in the bottom end portion of the operation shaft portion 80. In this way, the spacer member 70 is disposed between the ceiling plate 14A and the braking member 52, in a state in which the guide projection 78 is inserted in the guide hole 76B of the spacer wall 76 and the operation shaft portion 80 is inserted in the insert-through hole 64 of the braking member 52.

The lock mechanism 50 has the compression coil spring 82 which serves as an urging member and which urges the spacer member 70 downward. The compression coil spring 82 is disposed in a compressed state in which one end portion thereof abuts the ceiling plate 14A and the other end portion thereof abuts the respective spacer portions 74. An annular wall 84, which is for preventing positional offset of the compression coil spring 82, stands erect from the ceiling plate 14A. The one end portion of the compression coil spring 82 is fit-together with and engages with the annular wall 84.

In this way, the lock mechanism 50 urges the braking member 52 downward by the urging force of the compression coil spring 82 which is transmitted via the spacer member 70, and pushes the reel 28 against the annular rib 22 by this urging force. Namely, as shown in FIG. 4, when the magnetic tape T is not in use, the lock mechanism 50 positions the braking member 52 at the rotation locking position and impedes rotation of the reel 28 with respect to the case 12. Further, when the magnetic tape T is not in use, the lock mechanism 50 positions the spacer member 70 at the lock maintaining position.

In this state, because there is no gap in the vertical direction (the axial direction of the reel 28) between the braking member 52 and the ceiling plate 14A as described above, movement of the braking member 52 upward (toward the releasing position) is prevented, and the reel 28 is prevented from moving away from the annular rib 22. Moreover, in this state, the release operation portion 62 of the braking member 52 is exposed to the exterior from the pass-through hole 46 (the through hole 48A) of the reel 28 through the gear opening 20, and the operation shaft portion 80 (the engagement groove 80A) of the spacer member 70 is exposed to the exterior from the insert-through hole 64 of the release operation portion 62. At this time, the braking member 52 and the spacer member 70 do not project out further than the bottom surface (the outer surface) of the floor plate 16A of the case 12.

Figure 5:
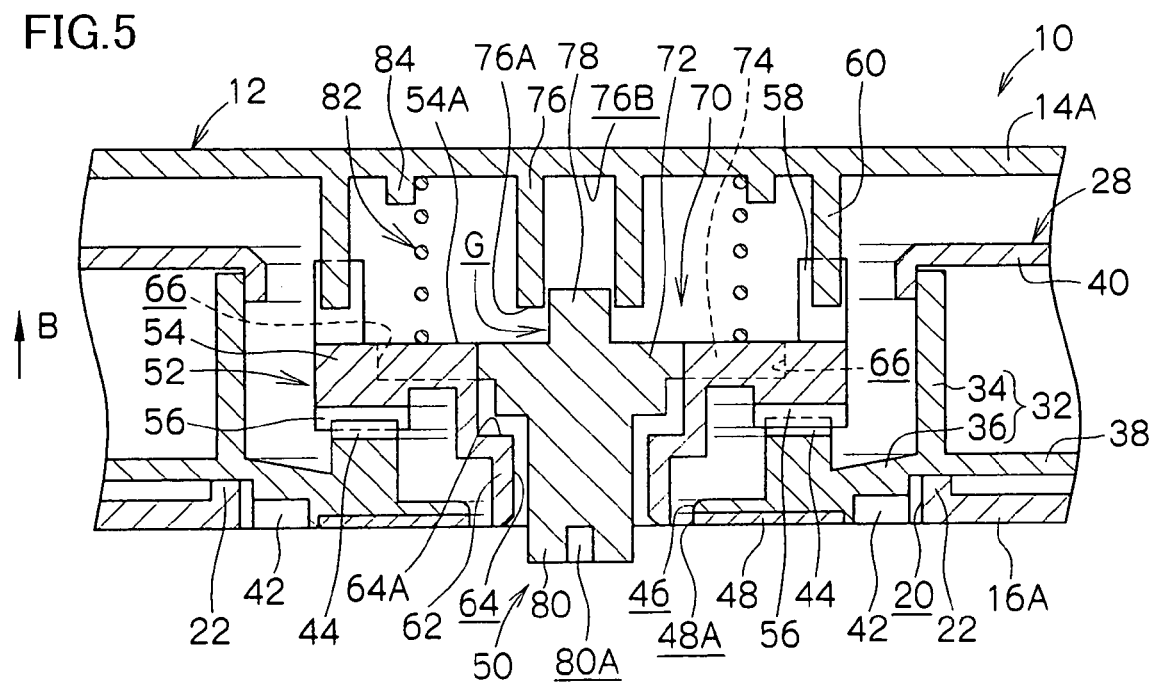
FIG. 5 is an enlarged sectional view of main portions, showing a release preparation state of the lock mechanism structuring the recording tape cartridge relating to the embodiment of the present invention.
Figure 8A:
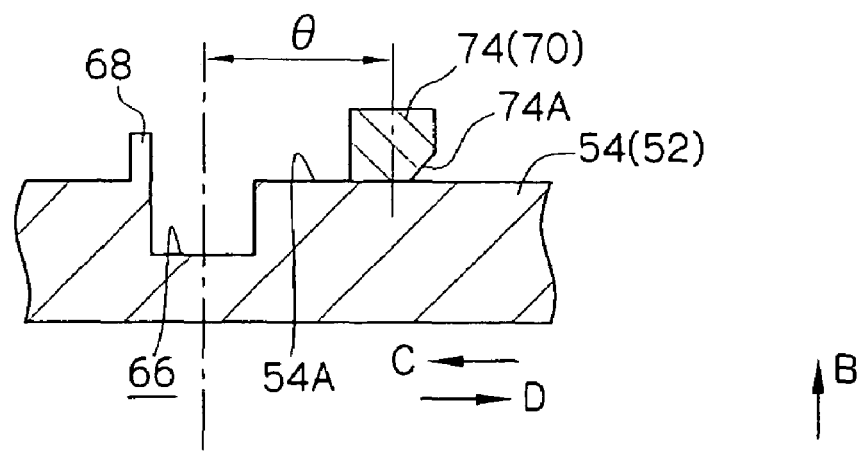
FIGS. 8A and 8B are schematic diagrams showing the lock mechanism structuring the recording tape cartridge relating to the embodiment of the present invention, where
Figure 8B:
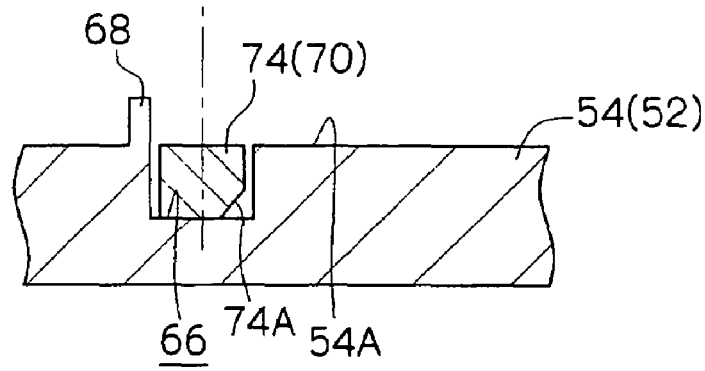

On the other hand, when the magnetic tape T is to be used, first, the spacer member 70 moves from the lock maintaining position to the release preparation position. Specifically, due to the rotation of the operation shaft portion 80 in the direction of arrow C, the spacer portions 74 slide along the top surface 54A of the disc portion 54 and are guided to positions above the relief recesses 66, and due to the urging force of the compression coil spring 82, the respective spacer portions 74 are made to enter into the respective relief recesses 66. In this way, as shown in FIG. 5, the gap G is formed between the spacer wall 76 of the case 12 and the disc portion of the braking member 52 which is positioned at the rotation locking position. As shown in expanded views in FIGS. 8A and 8B, an angle of rotation θ of the spacer member 70 between the lock maintaining position and the release preparation position is substantially 60° in the present embodiment. Further, the stopper walls 68 prevent the spacer portions 74 from passing by above the relief recesses 66 such that movement to the release preparation position is not realized. Due to an unillustrated releasing member of the drive device rotating in the direction of arrow C in a state of engaging with the engagement groove 80A, the operation shaft portion 80 is rotated in the direction of arrow C.

In this release preparation state, when the release operation portion 62 is pressed from beneath, as shown in FIG. 6, the braking member 52 is pushed upward against the urging force of the compression coil spring 82 and moves to the releasing position, such that the reel 28 can rotate with respect to the case 12 and can move away from the annular rib 22. Accompanying the relative approach of the rotating shaft toward the reel 28 from below and the operation of the driving gear meshing with the reel gear 42 (the relative movement), the release operation portion 62 is pushed by a releasing projection provided at the axially central portion of the rotating shaft. The releasing projection is formed, for example, in the shape of a cylindrical tube so as to not interfere with the operation shaft portion 80.

Then, the reel 28 is driven to rotate without contacting the case 12, in the state in which the reel 28 is raised up as shown in FIG. 7 due to the aforementioned relative movement while the rotating shaft meshes the driving gear together with the reel gear 42. When the reel 28 is driven to rotate, the braking member 52 is held at the releasing position due to the state of abutment between the release operation portion 62 and the releasing projection being maintained.

When the rotating shaft moves away from the reel 28 (i.e., when the rotating shaft moves downward relatively), at the lock mechanism 50, the reel 28 is pressed against the annular rib 22 due to the urging force of the compression coil spring, and the braking member 52 returns to the state of being positioned at the rotation locking position (the state shown in FIG. 5). Then, when, from this state, the operation shaft portion 80 is pushed upward until it abuts the spacer wall 76, and rotates in the direction of arrow D, the spacer member 70 returns to the lock maintaining position (the state shown in FIG. 4). Further, when the spacer member 70 is rotated in the direction of arrow D, in a case in which the braking member 52 has not been lowered completely to the rotation locking position, the edge portions of the relief recesses 66 at the disc portion 54 (the edge portions at the arrow D side where the stopper walls 68 do not exist) are pressed by the taper surfaces 74A of the spacer portions 74, such that the braking member 52 reliably falls to the rotation locking position.

Next, operation of the present embodiment will be described.

At the recording tape cartridge 10 having the above-described structure, when the magnetic tape T is not in use, as shown in FIG. 4, rotation of the reel 28, which is abutting the annular rib 22 (the floor plate 16A) of the case 12, with respect to the case 12 is impeded due to the braking gear 56 of the braking member 52, which is positioned at the rotation locking position, meshing together with the engaging gear 44. Further, the spacer member 70 is set (positioned), with substantially no gap, between the top surface 54A of the braking member 52 and the spacer wall 76 of the case 12, such that upward and downward movement of the braking member 52 is restricted.

Therefore, the upward and downward movement of the reel 28 also is restricted, and the reel 28 hardly joggles at all within the case 12. In particular, in the present embodiment, joggling of the reel 28 is markedly suppressed because the braking member 52 is pressed against the reel 28 due to the urging force of the compression coil spring 82 and the reel 28 is pressed against the annular rib 22.

At this time, the reel gear 42 and the reel plate 48 of the reel 28 are exposed from the gear opening 20, and the release operation portion 62 of the braking member 52 and the operation shaft portion 80 of the spacer member 70 are exposed from the pass-through hole 46 of the reel 28. Further, the opening 18 is closed by the leader block 30.

On the other hand, when the magnetic tape T is to be used, the recording tape cartridge 10 is loaded into a bucket (not illustrated) of the drive device along the direction of arrow A. When the recording tape cartridge 10 is loaded to a predetermined depth in the bucket, the releasing member of the drive device engages with the engagement groove 80A of the spacer member 70, and rotates substantially 60° in the direction of arrow C. Then, when the releasing member comes out from the engagement groove 80A, the spacer portions 74 enter into the relief recesses 66 due to the urging force of the compression coil spring 82. Namely, as shown in FIG. 5, the spacer member 70 moves to the release preparation position, and the gap G is formed between the top surface 54A of the braking member 52 and the spacer wall 76 of the case 12.

From this state, the bucket is lowered, and the rotating shaft of the drive device relatively approaches the gear opening 20 of the case 12 (relatively moves upward) and holds the reel 28. Specifically, the drive gear of the rotating shaft meshes together with the reel gear 42 while the rotating shaft attracts and holds the reel plate 48 in a non-contact state by the magnet.

Accompanying the meshing together of the reel gear 42 and the driving gear, i.e., the relative movement of the rotating shaft (adjacent side) in the axial direction toward the case 12, the releasing projection of the rotating shaft pushes the braking member 52 upward against the urging force of the compression coil spring 82. In this way, the meshing-together of the braking gear 56 and the engaging gear 44 is cancelled. Namely, as shown in FIG. 6, the braking member 52 moves to the releasing position. At this time, the spacer member 70, whose spacer portions 74 are within the relief recesses 66, moves upward together with the braking member 52.

Then, as shown in FIG. 7, the reel 28 is raised upward within the case 12 by the rotating shaft which moves relative to the case 12 as described above, and the reel 28 becomes able to rotate with respect to the case 12 in a state of non-contact in which the reel 28 is moved apart from the annular rib 22. This series of operations is carried out as the bucket, i.e., the recording tape cartridge 10, is lowered by a predetermined amount within the drive device.

Further, due to the lowering of the bucket, the positioning pins of the drive device respectively enter into the positioning holes 24, 26 of the case 12, and the positioning surfaces of the drive device abut the positioning surfaces 24A, 26A of the case 12. The recording tape cartridge 10 is thereby positioned in the horizontal directions and in the vertical direction with respect to the drive device. Thus, while a pull-out pin (not illustrated) of the pull-out means of the drive device engages with the engaging recess 30A of the leader block 30, the pull-out means pulls the leader block 30 out from the case 12 and guides the leader block 30 to the take-up reel of the drive device. The leader block 30 is fit into the take-up reel such that the arc-shaped surface 30B structures a portion of the take-up surface around which the magnetic tape T is taken-up.

In this state, when the leader block 30 rotates integrally with the take-up reel, the magnetic tape T is pulled-out from the case 12 through the opening 18 while being taken-up onto the reel hub of the take-up reel. At this time, the reel 28 of the recording tape cartridge 10 rotates synchronously with the tape-up reel, due to the torque of the rotating shaft which is transmitted by the driving gear which meshes with the reel gear 42. Information is recorded onto the magnetic tape T or information recorded on the magnetic tape T is played back by a recording/playback head disposed along a predetermined tape path of the drive device. At this time, the release operation portion 62 of the braking member 52, which cannot rotate with respect to the case 12, holds the braking member 52 at the releasing position while slidingly-contacting the releasing projection of the rotating shaft which drives and rotates the reel 28.

On the other hand, when the magnetic tape T is rewound onto the reel 28 and the leader block 30 is held in a vicinity of the opening 18 of the case 12, the bucket in which the recording tape cartridge 10 is loaded is raised. Thus, the reel 28 and the braking member 52 move downward relative to the case 12 while being supported by the driving gear and the releasing projection of the rotating shaft, respectively. When the reel 28 abuts the annular rib 22 and further lowering of the reel 28 is impeded, the meshing of the reel gear 42 and the driving gear is cancelled. When the braking gear 56 of the braking member 52 meshes together with the engaging gear 44 and further downward movement of the braking member 52 is impeded, the braking member 52 is set apart from the releasing projection. In this way, the supporting of the urging force of the compression coil spring 82 by the releasing projection ceases to exist, and due to this urging force, the braking member 52 is pressed against the reel 28 and the reel 28 is pressed against the annular rib 22.

Accompanying the relative lowering of the braking member 52 with respect to the case 12, the spacer member 70 is lowered together with the braking member 52 while the spacer portions 74 remain within the relief recesses 66, and as shown in FIG. 5, the spacer member 70 returns to the release preparation position. Namely, in this state, the gap G is formed between the spacer wall 76 and the top surface 54A of the braking member 52. The bucket stops when raised by a predetermined amount (an amount equal to the amount by which it was lowered).

From this state, the releasing member of the drive device enters into the engagement groove 80A of the spacer member 70, and first, moves upward and pulls the spacer portions 74 out from the relief recesses 66. Then, the releasing member rotates substantially 60° in the direction of arrow D, so as to position the spacer portions 74 on the top surface 54A of the disc portion 54. Namely, the spacer member 70 is returned to the lock maintaining position. In this way, the recording tape cartridge 10 (the lock mechanism 50) returns to the initial state in which rotation of the reel 28 with respect to the case 12 and axial direction movement of the reel 28 are impeded. In this state, the recording tape cartridge 10 is ejected from the bucket (the drive device) in the direction opposite to arrow A.

Here, the spacer member 70, which fills-in the gap G between the ceiling plate 14A and the braking member 52 when the recording tape cartridge 10 is not in use, is provided. Therefore, when the recording tape cartridge 10 is not in use, the reel 28 does not move greatly in the axial direction within the case 12. Accordingly, for example, even if force in the axial direction were to be applied to the reel 28 due to the impact of a drop or an erroneous operation such as the reel plate 48 being pushed or the like, the magnetic tape T wound on the reel 28 is protected. Further, because vertical direction movement of the braking member 52, together with that of the reel 28, within the case 12 is restricted, it is also possible to prevent the locking of the rotation of the reel from being released due to the aforementioned impact of a drop or the like. Therefore, it is possible to prevent the reel 28 from rotating and tightening or loosening of the winding of the magnetic tape T from occurring at the time of a drop.

The relief recesses 66 (the insert-through hole 64), into which the spacer portions 74 (the base portion 72) of the spacer member 70 enter, are provided in the braking member 52. Therefore, by a small movement stroke, the spacer member 70 forms the gap G (is pulled out from the gap G) and permits movement of the braking member 52 toward the ceiling plate 14A. Therefore, the function of, at the time when the recording tape cartridge 10 is to be used, canceling the state in which movement of the reel 28 in the axial direction is impeded, can be realized by a relatively compact structure.

Due to the operation shaft portion 80, which is provided integrally with the spacer member 70, being rotated in the direction of arrow C, the spacer member 70 rotates in the direction of arrow C, and the spacer member 70 moves from the lock maintaining position to the release preparation position at which the spacer portions 74 are within the relief recesses 66. Therefore, the function of, at the time when the recording tape cartridge 10 is to be used, canceling the state in which movement of the reel 28 in the axial direction is impeded, can be realized by a relatively simple structure. In particular, the plural (three) spacer portions 74, which are disposed at uniform intervals in the peripheral direction, enter into the respective relief recesses 66 due to the operation of the single operation shaft portion 80. Therefore, with a simple structure, the function of, at the time when the recording tape cartridge 10 is to be used, canceling the state in which movement of the reel 28 in the axial direction is impeded, can be realized while achieving the function of stably impeding vertical direction movement of the reel 28 and the braking member 52 when the recording tape cartridge 10 is not in use.

In this way, in the recording tape cartridge 10 relating to the present embodiment, the reel 28 can be prevented from moving greatly in the axial direction within the case 12 at times when the recording tape cartridge 10 is not in use.

Note that, in the above-described embodiment, the lock mechanism 50 is structured so as to have the compression coil spring 82. However, the present invention is not limited to the same. For example, in a structure in which the recording tape cartridge 10 is used in a horizontal drive device (a drive device into which the recording tape cartridge 10 is loaded with the axis of the reel 28 coinciding with the vertical direction), it is possible to not provide the compression coil spring 82. In this case, the urging force of the compression coil spring 82 is not applied to the region of sliding contact between the release operation portion 62 of the braking member 52 and the releasing projection of the rotating shaft when the reel 28 is driven to rotate, and wear of this region of sliding contact can be prevented or markedly suppressed.

Further, the above-described embodiment is a preferable structure in which the spacer portions 74 of the spacer member 70 rotate around the axial center of the base portion 72 and enter into the relief recesses 66. However, the present invention is not limited to the same. For example, the spacer member 70 may be structured to move between the lock maintaining position, at which the spacer member 70 fills-in the gap G, and the release preparation position, at which the spacer member 70 is pulled-out from the gap G, by moving in the radial direction of the reel 28. Namely, the present invention is not limited by the above-described preferable structures (configurations) of the braking member 52, the spacer member 70, the spacer wall 76, and the like. Accordingly, for example, in place of the structure in which the spacer member 70 is exposed from the gear opening 20 of the case 12 and is operated by the drive device, for example, the spacer member 70 may be exposed from a window portion provided in the forward-facing peripheral wall 14B so as to be operated by the drive device as the recording tape cartridge 10 is loaded into the bucket in the direction of arrow A.

Moreover, the above-described embodiment is structured such that the relief recesses 66, into which the spacer portions 74 enter such that the gap G is formed, are provided in the braking member 52. However, the present invention is not limited to the same. For example, a structure may be used in which relief portions which open downwardly are provided in the spacer wall 76 (the ceiling plate 14A). As the braking member 52 moves to the releasing position, the spacer portions 74 of this structure move upward together with the braking member 52 and enter into the relief portions. As the braking member 52 moves to the rotation locking position, these spacer portions 74 move upward together with the braking member 52 and are pulled-out from the relief portions. Therefore, in other words, the movement between the lock maintaining position and the release preparation position is achieved merely by motion (rotation) within a plane running along the top surface 54A. Therefore, there is no need for the spacer member 70 to move upward and downward independently of the braking member 52, and the releasing member of the drive device can be made to be simple. Moreover, the relief portions at the braking member 52 or the spacer wall 76 are not limited to the relief recesses 66 which are concave portions, and may be, for example, cut-outs or holes which pass through the disc portion 54 in the direction of plate thickness. Further, it goes without saying that the present invention is not limited by the absence/presence of, the configuration of, and the like of the spacer wall 76.

The above-described embodiment is structured such that rotation of the reel 28 is impeded by the braking gear 56 of the braking member 52 meshing together with the engaging gear 44 which is provided at the floor portion 36 of the reel hub 32. However, the present invention is not limited to the same. For example, a structure may be used in which the open end of the cylinder portion 34 is formed in a tapered shape, and the engaging gear 44 in the form of internal teeth is formed at this tapered surface, and the braking member 52 is set at the rotation locking position and the releasing position by moving in the radial direction of the reel 28.

In addition, the above-described embodiment is structured such that, after the operation shaft portion 80 is pushed upward, the operation shaft portion 80 rotates in the direction of arrow D and returns the spacer member 70 to the lock maintaining position. However, the present invention is not limited to the same. For example, a structure may be used in which the heights of the spacer portions 74 are formed to be greater than the depths of the relief recesses 66, and taper surfaces 74A are formed over the entire heights of the spacer portions 74, and the spacer member 70 rides up on the top surface 54A of the disc portion 54 merely by rotating in the direction of arrow D.

In the above-described embodiment, the recording tape cartridge 10 is a so-called single-reel recording tape cartridge in which the single reel 28 is accommodated within the case 12. However, the present invention is not limited to the same, and, for example, may be a structure in which the lock mechanism 50 is provided at one or both of the reels structuring a two-reel recording tape cartridge which accommodates two of the reels 28 (for drawing-out and taking-up).

Further, the magnetic tape T is used as the recording tape in the above-described embodiment. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

What is claimed is:

1. A recording tape cartridge comprising:
a case at which a ceiling plate and a floor plate are connected by a peripheral wall;
a reel around which a recording tape is wound, the reel accommodated within the case so as to be able to approach and move away from the floor plate;
an engaging portion provided at the reel, and facing the ceiling plate;
a rotation locking member provided so as to be unable to rotate with respect to the case and so as to be able to approach and move away from the ceiling plate, and when the recording tape cartridge is not in use, the rotation locking member engages with the engaging portion of the reel which is abutting the floor plate and impedes rotation of the reel, and the rotation locking member is operated by a drive device and moves away from the engaging portion and allows the reel to rotate and to move away from the floor plate; and
a spacer member provided between the ceiling plate and the rotation locking member, and when the recording tape cartridge is not in use, the spacer member fills-in a gap between the ceiling plate and the rotation locking member, and before the rotation locking member is operated by the drive device, the spacer member is operated by the drive device and is pulled-out from the gap.

2. A recording tape cartridge comprising:
a reel having a hub which is formed in a shape of a cylindrical tube having a floor portion and around whose outer peripheral portion a recording tape is wound, and an engaging portion provided at an inner surface of the floor portion of the hub;
a case at which a ceiling plate and a floor plate are connected by a peripheral wall, the case accommodating the reel, whose engaging portion is facing the ceiling plate, such that the reel can approach and move away from the floor plate;
a rotation locking member provided so as to be unable to rotate with respect to the case and so as to be able to approach and move away from the ceiling plate, and when the recording tape cartridge is not in use, the rotation locking member engages with the engaging portion of the reel which is abutting the floor plate and impedes rotation of the reel, and the rotation locking member is operated by a drive device and moves away from the engaging portion and allows the reel to rotate and to move away from the floor plate;
a relief portion provided at the rotation locking member and opening toward the ceiling plate; and
a spacer member provided between the ceiling plate and the rotation locking member, and when the recording tape cartridge is not in use, the spacer member fills-in a gap between the ceiling plate and an end surface of the rotation locking member, and before the rotation locking member is operated by the drive device, the spacer member is operated by the drive device and enters into the relief portion.

3. The recording tape cartridge of claim 2, wherein the spacer member is structured to have an operation portion which is provided coaxially within the hub and is operated by the drive device and rotates around an axis of the hub, and a spacer portion which enters into the relief portion due to rotation of the operation portion.

4. The recording tape cartridge of claim 3, wherein a plurality of the spacer portions and the relief portions are provided.

5. The recording tape cartridge of claim 3, wherein an engaging portion that engages with the drive device is provided at an end portion of the operation portion of the spacer member.

6. The recording tape cartridge of claim 2, wherein the spacer member is provided between a wall portion, which is provided at the ceiling plate in protruding manner toward the rotation locking member, and the rotation locking member, and when the recording tape cartridge is not in use, the spacer member fills-in the gap between an end portion of the wall portion and the end surface of the rotation locking member.

7. The recording tape cartridge of claim 2, wherein a stopper wall is provided at an one end, in a rotating direction of the spacer member, of an opening of the relief portion.

8. A recording tape cartridge comprising:
a case at which a ceiling plate and a floor plate are connected by a peripheral wall;
a reel around which a recording tape is wound, the reel accommodated within the case so as to be able to approach and move away from the floor plate;
an engaging portion provided at the reel, and facing the ceiling plate;
a rotation locking member provided so as to be unable to rotate with respect to the case and so as to be able to approach and move away from the ceiling plate, and when the recording tape cartridge is not in use, the rotation locking member engages with the engaging portion of the reel which is abutting the floor plate and impedes rotation of the reel, and the rotation locking member is operated by a drive device and moves away from the engaging portion and allows the reel to rotate and to move away from the floor plate; and
a spacer member provided between the ceiling plate and the rotation locking member, and
when the recording tape cartridge is not in use, the spacer member fills-in a gap between the ceiling plate and the rotation locking member to restrict movement of the rotation locking member in axial direction such that movement of the reel away from the floor plate is impeded, and
before the rotation locking member is operated by the drive device, the spacer member is operated by the drive device and is pulled-out from the gap to allow movement of the rotation locking member within the gap in the axial direction such that movement of the reel away from the floor plate is allowed.

9. The recording tape cartridge of claim 8 further comprising a relief portion, provided at one of the rotation locking member side or the ceiling plate side, that can accommodate at least a portion of the spacer member.

10. The recording tape cartridge of claim 9, wherein the spacer member is structured to have an operation portion which is provided coaxially within a hub of the reel and is operated by the drive device and rotates around an axis of the hub, and a spacer portion which enters into the relief portion due to rotation of the operation portion.

* * * * *